United States Patent
Um

(10) Patent No.: US 11,216,368 B2
(45) Date of Patent: Jan. 4, 2022

(54) MEMORY SYSTEM FOR GARBAGE COLLECTION USING PAGE OFFSETS, INVALID OFFSET RATIO, SEQUENTIAL RATIO, AND LOGICAL ADDRESS PREDICTION

(71) Applicant: SK hynix Inc., Icheon (KR)

(72) Inventor: Gipyo Um, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/927,756

(22) Filed: Jul. 13, 2020

(65) Prior Publication Data

US 2021/0224187 A1    Jul. 22, 2021

(30) Foreign Application Priority Data

Jan. 17, 2020 (KR) .................. 10-2020-0006576

(51) Int. Cl.
*G06F 12/02* (2006.01)
*G06F 12/0891* (2016.01)
*G06F 12/0882* (2016.01)

(52) U.S. Cl.
CPC ...... *G06F 12/0253* (2013.01); *G06F 12/0246* (2013.01); *G06F 12/0882* (2013.01); *G06F 12/0891* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 8,762,627 B2 | 6/2014 | Sela | |
| 8,856,475 B1 * | 10/2014 | Meir | G06F 12/0253 711/165 |
| 10,229,050 B2 * | 3/2019 | Choi | G06F 12/0246 |
| 2011/0055455 A1 * | 3/2011 | Post | G06F 12/0246 711/103 |
| 2014/0032817 A1 * | 1/2014 | Bux | G06F 12/0261 711/103 |
| 2015/0261671 A1 * | 9/2015 | Chu | G06F 12/0246 711/103 |
| 2016/0103617 A1 * | 4/2016 | Kang | G06F 3/0679 711/103 |

(Continued)

FOREIGN PATENT DOCUMENTS

KR    20090116505 A    11/2009

*Primary Examiner* — Jared I Rutz
*Assistant Examiner* — Marwan Ayash

(57) ABSTRACT

A memory system includes a plurality of memory blocks each including a plurality of pages, each page including a plurality of offsets, and a controller. The controller includes a memory and performs a garbage collection operation on a victim block using the memory. The controller selects the victim block from among the plurality of memory blocks, calculates an invalid offset ratio by checking whether an invalid offset exists among a plurality of offsets in a valid page included in the victim block. When the invalid offset ratio is included in a predetermined threshold range, the controller calculates a sequential ratio of the valid page, predicts a logical address of the invalid offset depending on the sequential ratio, and stores, in the memory, valid data stored in a plurality of valid offsets in the valid page and valid data stored in a memory region corresponding to the predicted logical address.

20 Claims, 11 Drawing Sheets

(56) References Cited

U.S. PATENT DOCUMENTS

2016/0124848 A1\* 5/2016 Bellorado .............. G06F 12/12
　　　　　　　　　　　　　　　　　　　　711/103
2018/0285256 A1\* 10/2018 Oh ........................ G06F 3/0679

\* cited by examiner

FIG. 7
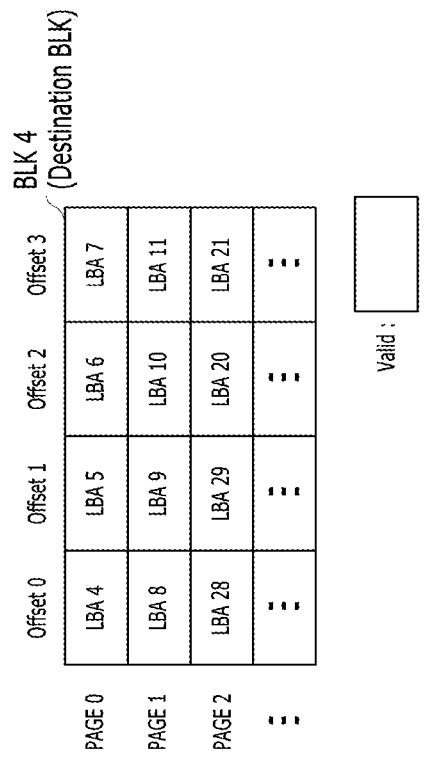
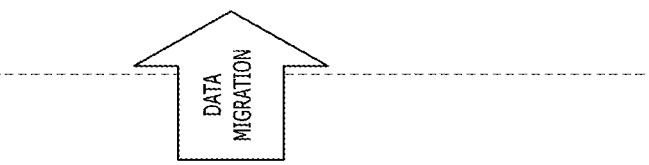

FIG. 8

| L2P MAP TABLE | | | |
|---|---|---|---|
| LBA # | PBA | | |
| | BLK # | PAGE # | Offset # |
| ⋮ | ⋮ | ⋮ | ⋮ |
| LBA4 | BLK 1 | PAGE 0 | Offset 0 |
| LBA5 | BLK 0 | PAGE 1 | Offset 1 |
| LBA6 | BLK 0 | PAGE 1 | Offset 2 |
| LBA7 | BLK 0 | PAGE 1 | Offset 3 |
| LBA8 | BLK 0 | PAGE 2 | Offset 0 |
| LBA9 | BLK 1 | PAGE 0 | Offset 1 |
| LBA10 | BLK 0 | PAGE 2 | Offset 2 |
| LBA11 | BLK 0 | PAGE 2 | Offset 3 |
| ⋮ | ⋮ | ⋮ | ⋮ |
| LBA20 | BLK 0 | PAGE 3 | Offset 2 |
| LBA21 | BLK 0 | PAGE 3 | Offset 3 |
| ⋮ | ⋮ | ⋮ | ⋮ |
| LBA28 | BLK 0 | PAGE 3 | Offset 0 |
| LBA29 | BLK 1 | PAGE 1 | Offset 3 |

MEMORY SYSTEM FOR GARBAGE COLLECTION USING PAGE OFFSETS, INVALID OFFSET RATIO, SEQUENTIAL RATIO, AND LOGICAL ADDRESS PREDICTION

CROSS-REFERENCE TO RELATED APPLICATION

This application claims priority under 35 U.S.C. § 119 to Korean Patent Application No. 10-2020-0006576 filed on Jan. 17, 2020, which is incorporated herein by reference in its entirety.

BACKGROUND

1. Field

Embodiments of the present disclosure relate to a semiconductor device, and more particularly, to a memory system for garbage collection and an operating method thereof.

2. Discussion of the Related Art

Recently, the paradigm for the computing environment has changed to ubiquitous computing in which computer systems can be used anytime everywhere. Therefore, the use of portable electronic devices such as mobile phones, digital cameras, and notebook computers has rapidly increased. Such a portable electronic device generally uses a memory system including a memory device, such as a data storage device. The data storage device is used as a main or secondary memory device of the portable electronic device.

Since the data storage device including a nonvolatile memory device has no mechanical driving unit (e.g., a mechanical arm with a read/write head) as compared with a hard disk device, the data storage device has excellent stability and durability, a quick data access rate, and low power consumption. The data storage device having such advantages may include any of a universal serial bus (USB) memory device, a memory card having various interfaces, a solid state drive (SSD), and the like.

SUMMARY

Various embodiments are directed to a memory system for garbage collection and an operating method thereof.

Also, various embodiments are directed to a memory system and an operating method thereof, in which, while valid data stored in one or more valid offsets included in a valid page of a victim block are migrated to a destination block when performing garbage collection, fragmented data that had been stored in invalid offsets included in the valid page are stored in the destination block by checking them using a map table, thereby improving read performance.

In an embodiment, a memory system may include: a plurality of memory blocks each including a plurality of pages, each of the plurality of pages including a plurality of offsets; and a controller including a memory, and configured to perform a garbage collection operation on a victim block using the memory, wherein the controller selects the victim block from among the plurality of memory blocks, calculates an invalid offset ratio by checking whether an invalid offset exists among a plurality of offsets in a valid page included in the victim block, and, when the invalid offset ratio is included in a predetermined threshold range, calculates a sequential ratio of the valid page, predicts a logical address of the invalid offset depending on the sequential ratio, stores valid data stored in a plurality of valid offsets in the valid page and valid data stored in a memory region corresponding to the predicted logical address, in the memory, the sequential ratio of the valid page being calculated using expectation values corresponding to the plurality of offsets in the valid page.

In an embodiment, a method for operating a memory system including a plurality of memory blocks and a controller for controlling a garbage collection operation on the plurality of memory blocks, the method comprising: selecting a victim block from among the plurality of memory blocks; calculating an invalid offset ratio by checking whether an invalid offset is included in a plurality of offsets configuring a valid page included in the victim block; setting expectation values corresponding to the plurality of offsets when the invalid offset ratio is included in a predetermined threshold range; calculating a sequential ratio of the valid page using expectation values of a plurality of valid offsets among the plurality of offsets; predicting, in the case where the sequential ratio of the valid page is equal to or higher than a predetermined threshold value, an expectation value corresponding to an invalid offset among the expectation values corresponding to the plurality of offsets, as a logical address of the invalid offset; and storing valid data stored in a memory region corresponding to the predicted logical address and valid data stored in the plurality of valid offsets, in a destination block.

In the present technology, while valid data stored in one or more valid offsets included in a valid page of a victim block are stored in a destination block when performing garbage collection, in the case where an invalid offset is included in the valid page, the sequentiality of logical block addresses of the valid data stored in the valid page is determined, When the valid data are determined as sequential data, data that had been stored in the invalid offset are searched for and are stored in the destination block, thereby improving read performance.

In the present technology, when performing garbage collection on a victim block, in the case where an invalid offset is included in a plurality of offsets of a valid page in the victim block, a sequential ratio of the valid page is calculated using logical block addresses corresponding to valid offsets among the plurality of offsets, a logical block address corresponding to the invalid offset included in the valid page is predicted using the sequential ratio, and data is read from a physical address corresponding to the predicted logical block address and is stored in a destination block, thereby improving read performance.

BRIEF DESCRIPTION OF THE DRAWINGS

FIGS. 6 to 8 are diagrams for describing a garbage collection operation in a memory system in accordance with an embodiment of the present disclosure.

DETAILED DESCRIPTION

Figure 1:
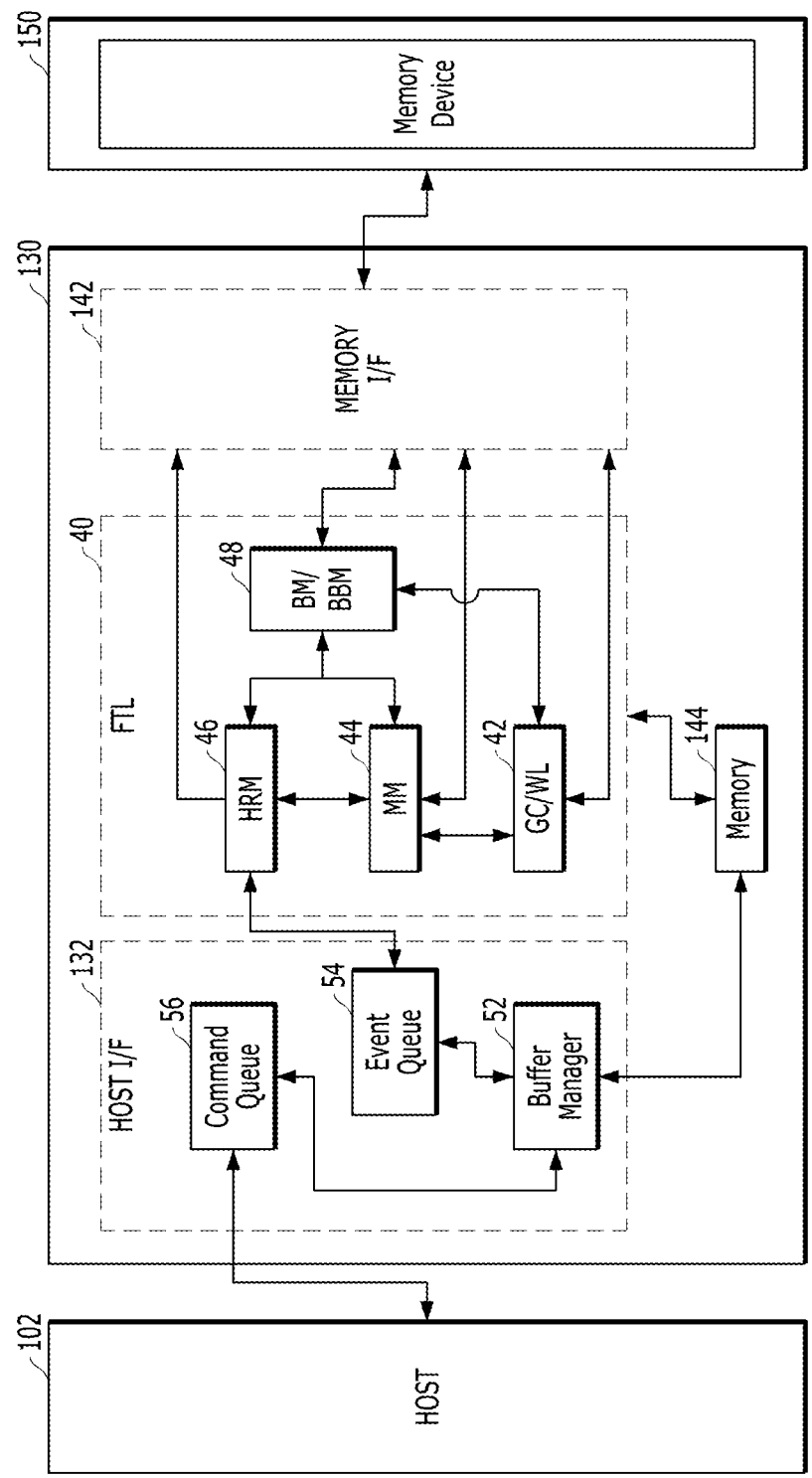
FIG. 1 illustrates a controller in a memory system according to an embodiment of the present disclosure.

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

FIG. 1 illustrates a memory system according to an embodiment of the present disclosure. Referring to FIG. 1, the memory system includes a controller 130 and a memory device 150. The controller 130 cooperates with a host 102 and the memory device 150. The controller 130 may include a host interface (I/F) 132, flash translation layer (FTL) circuitry 40, a memory interface (I/F) 142, and a memory 144.

The host interface 132 may handle commands and data from the host 102. By way of example but not limitation, the host interface 132 may include a command queue 56, a buffer manager 52 and an event queue 54. The command queue 56 may sequentially store commands and data from the host 102 and output them to the buffer manager 52 in a stored order. The buffer manager 52 may classify, manage, or adjust the commands and the data, which are delivered from the command queue 56. The event queue 54 may sequentially transmit events for processing the commands and the data, from the buffer manager 52.

A plurality of commands or data of the same characteristic may be continuously received from the host 102, or commands and data of different characteristics may be transmitted to the memory system after being mixed or jumbled. For example, a plurality of commands for reading data (i.e., read commands) may be delivered, or read commands and program/write commands may be alternately transmitted to the memory system. The host interface 132 may store commands and data, which are received from the host 102, to the command queue 56 sequentially. Thereafter, the host interface 132 may estimate or predict what kind of internal operation the controller 130 will perform according to the characteristics, e.g., type, of the command and data, which is received from the host 102. The host interface 132 may determine a processing order and a priority of commands and data, based at least on their characteristics. According to characteristics of commands and data, from the host 102, the buffer manager 52 in the host interface 132 is configured to determine whether the buffer manager 52 should store commands and data in the memory 144, or whether the buffer manager 52 should deliver the commands and the data into the flash translation layer (FTL) circuitry 40. The event queue 54 receives events, entered from the buffer manager 52, which are to be internally executed and processed by the memory system or the controller 130 in response to the commands and the data from the host 102, so as to deliver the events into the flash translation layer (FTL) circuitry 40 in the order received.

In accordance with an embodiment, the flash translation layer (FTL) circuitry 40 may include a state manager (GC/WL) 42, a map manager (MM) 44, a host request manager (HRM) 46, and a block manager (BM/BBM) 48. The host request manager 46 may manage the events entered from the event queue 54. The map manager 44 may handle or control map data. The state manager 42 may perform garbage collection (GC) or wear leveling (WL). The block manager 48 may execute commands or instructions onto a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry or request to the map data manager 44, to determine a physical address corresponding to the logical address which is entered with the events. The host request manager 46 may send a read request with the physical address to the memory interface 142, to process the read request (i.e., handle the events). On the other hand, the host request manager 46 may send a program request (or write request) to the block manager 48, to program entered data to an empty page (i.e., a page having no data) in the memory device 150, and then, may transmit a map update request corresponding to the program request to the map manager 44, thereby updating mapping addresses.

Here, the block manager 48 may convert a program request delivered from the host request manager 46, the map data manager 44, and/or the state manager 42 into a flash program request used for the memory device 150, to manage flash blocks in the memory device 150. In order to enhance program or write performance of the memory system, the block manager 48 may collect program requests and send flash program requests for multiple-plane and one-shot program operations to the memory interface 142. The block manager 48 may send several flash program requests to the memory interface 142 to enhance parallel processing of the multi-channel and multi-directional flash controller.

The block manager 48 may be configured to manage blocks in the memory device 150 according to the number of valid pages, select and erase blocks having no valid pages when a free block is needed, and select a block including the least number of valid pages when it is determined that garbage collection is necessary. The state manager 42 may perform garbage collection to move the valid data to an empty block and erase remaining data in the blocks from which the valid data was moved so that the block manager 48 may have enough free blocks (i.e., empty blocks with no data). If the block manager 48 provides information regarding a block to be erased to the state manager 42, the state manager 42 is able to check all flash pages of the block to be erased to determine whether each page is valid.

For example, to determine validity of each page, the state manager 42 may identify a logical address stored in an out-of-band (OOB) area of each page. To determine whether each page is valid or not, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is complete.

The map manager 44 may manage a logical-to-physical mapping table. The map manager 44 may process requests such as queries and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) has not been completed, the map manager 44 may not perform the mapping table update. This is because the map request is issued with old physical information if the state manger 42 requests a map update and a valid page copy is not completed until later. The map manager 44 may perform a map update operation to ensure accuracy only if the latest map table still points to the old physical address.

According to an embodiment, at least one of the state manager 42, the map manager 44 and the block manager 48 may include a garbage collection module (GCM) 196 and a map data manager 198 which will be described with reference to FIG. 5. For example, at least one of the state manager 42, the map manager 44 and the block manager 48 may perform a background operation even though there is no command transmitted from the host interface unit 132.

The memory interface 142 may serve as an interface for handling commands and data transferred between the controller 130 and the memory device 150 in order to allow the controller 130 to control the memory device 150 in response to a request delivered from the host 102. The memory interface 142 may generate a control signal for the memory device 150 and may process write data to be written in the memory device 150 or read data outputted from the memory device 150 under the control of the processor 134 when the memory device 150 is a flash memory, in particular, when the memory device 150 is a NAND flash memory. The memory interface 142 may provide operations of a NAND flash interface between the controller 130 and the memory device 150. In accordance with an embodiment, the memory interface 142 may be implemented with firmware called a flash interface layer (FIL) as a component for exchanging data with the memory device 150.

The memory device 150 may include a plurality of memory blocks. Each of the plurality of memory blocks may be a single level cell (SLC) memory block or a multi-level cell (MLC) memory block, according to the number of bits that can be stored or represented in one memory cell of such block. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have a larger storage capacity for the same space compared to the SLC memory block. The MLC memory block can be highly integrated in terms of storage capacity. In an embodiment, the memory device 150 may be implemented with MLC memory blocks, such as a double level cell memory block, a triple level cell (TLC) memory block, a quadruple level cell (QLC) memory block or a combination thereof. The double level memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment of the present disclosure, the memory device 150 is a nonvolatile memory such as a flash memory that is a NAND flash memory, a NOR flash memory, or the like. In another embodiment, the memory device 150 may be at least one of a phase change random access memory (PCRAM), a ferroelectrics random access memory (FRAM), a spin injection magnetic memory (e.g., a spin transfer torque magnetic random access memory (STT-MRAM)), and the like.

Figure 2:
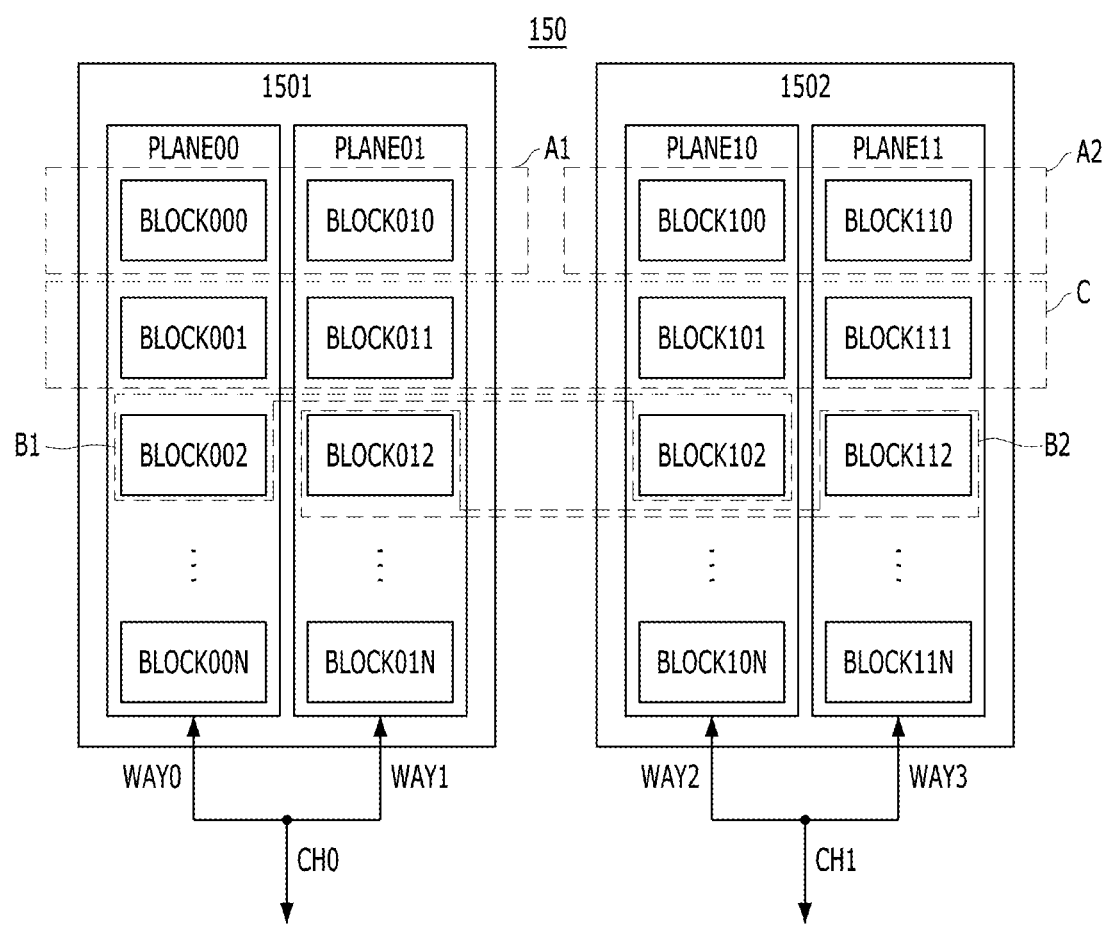
FIG. 2 is a diagram illustrating a super memory block used in a memory system in accordance with an embodiment of the present disclosure.

FIG. 2 is a diagram illustrating a super memory block used in a memory system in accordance with an embodiment of the present disclosure.

FIG. 2 illustrates memory dies 1501 to 150n included in a memory device such as the memory device 150 of FIG. 1. For example, the memory device 150 may include a first memory die (DIE0) 1501 and a second memory die (DIE1) 1502.

Each of the first and second memory dies 1501 and 1502 may include a plurality of planes. For example, the first memory die 1501 may include a first plane PLANE00 and a second plane PLANE01, and the second memory die 1502 may include a third plane PLANE10 and a fourth plane PLANE11. Each of the plurality of planes may include a plurality of blocks. For example, the first plane PLANE00 may include first to $N^{th}$ memory blocks BLOCK000 to BLCOK00N, and the second plane PLANE01 may include first to $N^{th}$ memory blocks BLOCK010 to BLCOK01N. The third plane PLANE10 may include first to $N^{th}$ memory blocks BLOCK100 to BLCOK10N, and the fourth plane PLANE11 may include first to $N^{th}$ memory blocks BLOCK110 to BLCOK11N.

The first memory die 1501 is capable of inputting and outputting (inputting/outputting) data through a zeroth channel CH0, and the second memory die 1502 is capable of inputting/outputting data through a first channel CH1. The zeroth channel CH0 and the first channel CH1 may input/output data in an interleaving scheme.

The first memory die 1501 includes the plurality of planes PLANE00 and PLANE01 corresponding to a plurality of ways WAY0 and WAY1, respectively, which are capable of inputting/outputting data in the interleaving scheme by sharing the zeroth channel CH0.

The second memory die 1502 includes the plurality of planes PLANE10 and PLANE11 corresponding to a plurality of ways WAY2 and WAY3, respectively, which are capable of inputting/outputting data in the interleaving scheme by sharing the first channel CH1.

A plurality of memory blocks in the memory device 150 may be divided into a plurality of groups based on physical locations where the same way or channel is used.

While FIG. 2 shows, as an example, a configuration of the memory device 150 including two dies, each having two planes, embodiments are not limited thereto. Any suitable die and/or plane configuration may be used based on system design considerations. The number of memory blocks in each plane may vary as well.

The controller 130 of FIG. 1 may divide a plurality of memory blocks in different dies or different planes into a plurality of memory block groups based on their physical locations, and manage the memory block groups as super memory blocks.

The scheme in which the controller 130 groups the plurality of memory blocks into the super memory blocks and manages the super memory blocks may be performed in various ways. Three schemes will be described below as examples with reference to FIG. 2.

For example, a first scheme is that the controller 130 groups an arbitrary memory block, e.g., BLOCK000, of the first plane PLANE00 and an arbitrary memory block, e.g., BLOCK010, of the second plane PLANE01 in the first memory die 1501 in the memory device 150, and manages the grouped memory blocks BLOCK000 and BLOCK010 as a single super memory block A1. When the first scheme is applied to the second memory die 1502 in the memory device 150, the controller 130 may group an arbitrary memory block, e.g., BLOCK 100, of the third plane PLANE10 and an arbitrary memory block, e.g., BLOCK 110, of the fourth plane PLANE11 in the second memory die 1502, and manage the grouped memory blocks BLOCK100 and BLOCK110 as a single super memory block A2.

For example, a second scheme is that the controller 130 groups an arbitrary memory block, e.g., BLOCK002, of the first plane PLANE00 in the first memory die 1501 and an arbitrary memory block, e.g., BLOCK102, of the third plane PLANE10 in the second memory die 1502, and manages the grouped memory blocks BLOCK002 and BLOCK102 as a single super memory block B1. In addition, according to the second scheme, the controller 130 may group an arbitrary memory block, e.g., BLOCK012, of the second plane PLANE01 in the first memory die 1501 and an arbitrary memory block, e.g., BLOCK112, of the fourth plane PLANE11 in the second memory die 1502, and manage the grouped memory blocks BLOCK012 and BLOCK112 as a single super memory block B2.

For example, a third scheme is that the controller 130 groups an arbitrary memory block, e.g., BLOCK001, of the first plane PLANE00 in the first memory die 1501, an arbitrary memory block, e.g., BLOCK011, of the second plane PLANE01 in the first memory die 1501, an arbitrary memory block, e.g., BLOCK101, of the third plane PLANE10 in the second memory die 1502, and an arbitrary memory block, e.g., BLOCK111, of the fourth plane PLANE11 in the second memory die 1502, and manages the grouped memory blocks BLOCK001, BLOCK011, BLOCK101, and BLOCK111 as a single super memory block C.

Accordingly, memory blocks in each of the super memory blocks may be simultaneously selected through the interleaving scheme. For example, the interleaving scheme may include a channel interleaving scheme, a memory die interleaving scheme, a memory chip interleaving scheme, or a way interleaving scheme.

Figure 3:
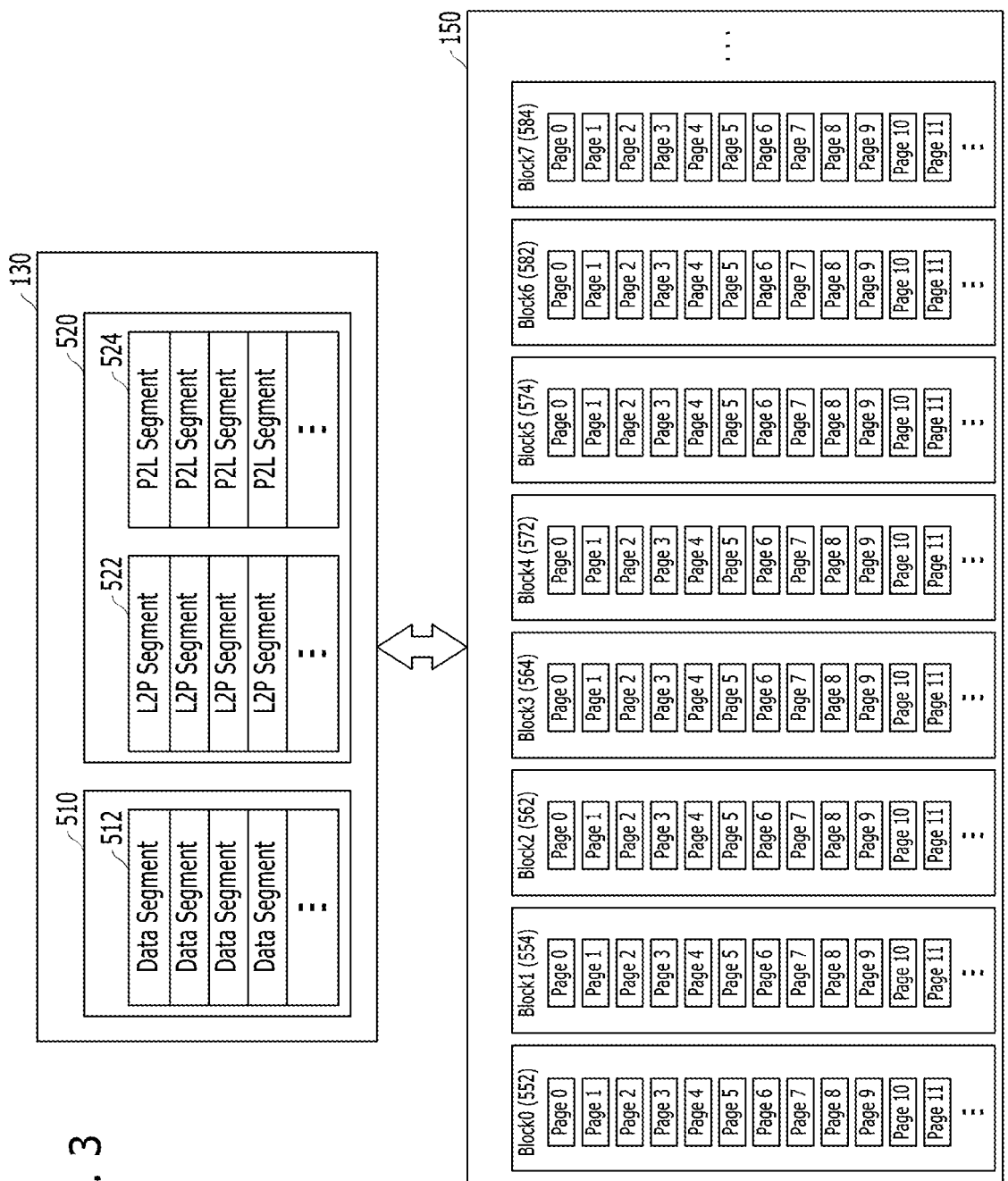
FIG. 3 is a diagram illustrating a data processing operation performed in a memory system in accordance with an embodiment.

FIG. 3 is a diagram illustrating a data processing operation performed in a memory system in accordance with an embodiment. The data processing operation shown in FIG. 3 will be described with reference to the memory system shown in FIG. 1. Referring to FIGS. 1 and 3, the controller 130 performs a command operation corresponding to a command received from the host 102. For example, when a program command is provided by the host 102, the controller 130 performs a program operation to program or store user data corresponding to the program command in a plurality of pages in memory blocks 552, 554, 562, 564, 572, 574, 582, and 584 of the memory device 150.

The controller 130 generates and updates metadata for the user data, and programs or stores the metadata in the memory blocks 552, 554, 562, 564, 572, 574, 582, and 584 of the memory device 150. The metadata includes logical to physical (logical/physical or L2P) information and physical to logical (physical/logical or P2L) information for the user data stored in the memory blocks 552, 554, 562, 564, 572, 574, 582, and 584. Also, the metadata may include one or more of information on command data corresponding to a command received from the host 102, information on a command operation corresponding to the command, information on memory blocks of the memory device 150 for which the command operation is to be performed, and information on map data corresponding to the command operation. In other words, the metadata may include all information and data, excluding the user data, corresponding to the command received from the host 102.

Referring to FIG. 3, the controller 130 may include a first buffer 510 and a second buffer 520. The controller 130 stores user data corresponding to a program command received from the host 102 in the first buffer 510. When the user data includes data segments 512, the controller 130 stores the data segments 512 of the user data in the first buffer 510 that is used as a data buffer/cache. The first buffer 510 may be included in the memory 144 of the controller 130 shown in FIG. 1. Thereafter, the controller 130 programs or stores the data segments 512 stored in the first buffer 510 in the pages included in the memory blocks 552, 554, 562, 564, 572, 574, 582, and 584 of the memory device 150.

As the data segments 512 of the user data are programmed or stored in the pages in the memory blocks 552, 554, 562, 564, 572, 574, 582 and 584, the controller 130 generates L2P segments 522 and P2L segments 524 as metadata. Then, the controller 130 stores the L2P segments 522 and the P2L segments 524 in the second buffer 520 of the controller 130. The second buffer 520 may be included in the memory 144 of the controller 130. In the second buffer 520, the L2P segments 522 and the P2L segments 524 may be stored in the form of a list. Then, the controller 130 programs or stores the L2P segments 522 and the P2L segments 524 stored in the second buffer 520 in pages of the memory blocks 552, 554, 562, 564, 572, 574, 582, and 584 through a map flush operation.

The controller 130 performs the command operation corresponding to the command received from the host 102. For example, the controller 130 performs a read operation corresponding to a read command. During the read operation, the controller 130 checks L2P segments 522 and P2L segments 524 of user data corresponding to the read command by loading them into the second buffer 520 from the memory device 150. Then, the controller 130 reads data segments 512 of the user data from a storage position of the memory device 150 that is recognized by the L2P segments 522 and the P2L segments 524. That is, the controller 130 reads the data segments 512 of the user data from a specific page of a specific memory block among the memory blocks 552, 554, 562, 564, 572, 574, 582, and 584 based on the L2P segments 522 and the P2L segments 524. Then, the controller 130 stores the data segments 512, read from the specific page, in the first buffer 510, and then provides the data segments 512 to the host 102.

Figure 4:
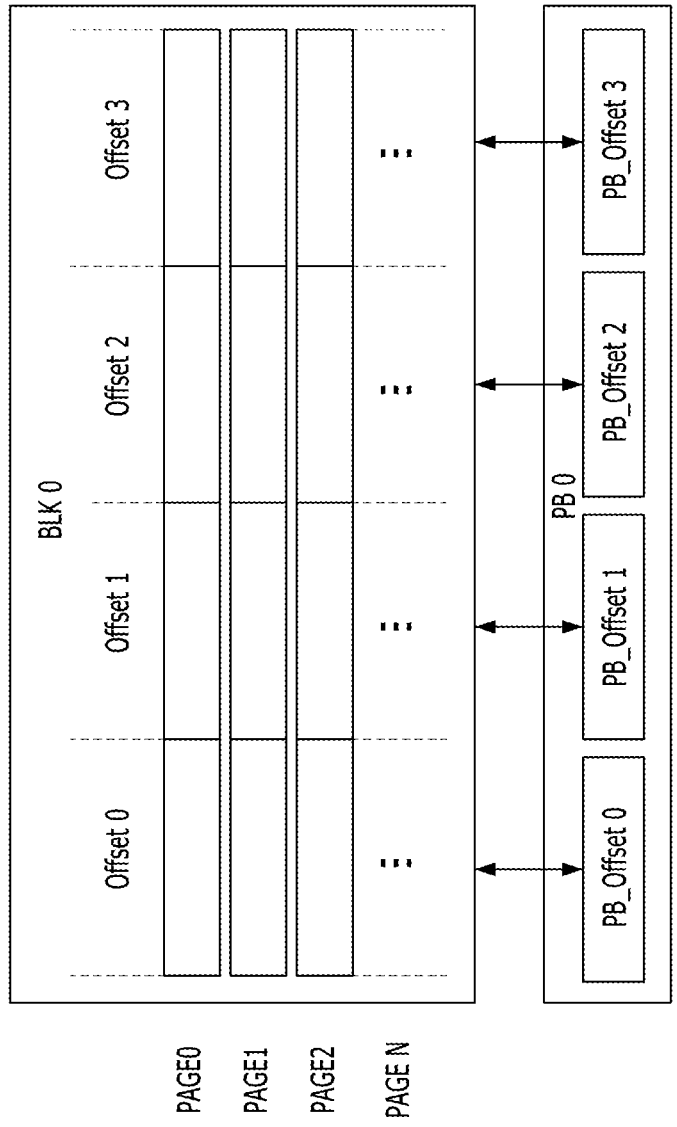
FIG. 4 is a diagram illustrating a configuration of pages constituting a block included in a memory device.

FIG. 4 is a diagram illustrating a configuration of pages which constitute a memory block included in the memory device 150 shown in FIG. 1.

Referring to FIG. 4, in the memory device 150, each of pages PAGE 0 to PAGE N included in each memory block may include a predetermined number of offsets, e.g., Offset 0 to Offset 3. Therefore, a sum of the numbers of memory cells included in the predetermined number of offsets Offset 0 to Offset 3 may be the same as the number of memory cells included in each of the pages PAGE 0 to PAGE N.

When each of the pages PAGE 0 to PAGE N includes the predetermined number of offsets Offset 0 to Offset 3, each of a plurality of page buffers respectively corresponding to a plurality of memory blocks may include a predetermined number of offset page buffers PB_Offset 0 to PB_Offset 3.

Through the configuration in which each of the PAGE 0 to PAGE N includes the offsets Offset 0 to Offset 3, data smaller than a storage capacity of one page may be inputted/outputted. For example, referring to FIG. 4, one page includes four offsets Offset 0 to Offset 3. In order to input/output data in a page unit, data may be inputted/outputted by using all of the four offsets Offset 0 to Offset 3 and four offset page buffers PB_Offset 0 to PB_Offset 3 corresponding thereto.

In order to input/output data in a unit smaller than the page unit, that is, in a unit of three offsets, data may be inputted/outputted by selecting only three offsets from among the four offsets Offset 0 to Offset 3. In this case, dummy data, data not selected as an output target, or invalid data may be stored in the remaining one offset except the three offsets selected as data input/output targets from among the four offsets Offset 0 to Offset 3.

Similarly, in order to input/output data in a unit smaller than the page unit, that is, in a unit of two offsets, data may be inputted/outputted by selecting only two offsets from among the four offsets Offset 0 to Offset 3. In this case, dummy data, data not selected as output targets, or invalid data may be stored in the remaining two offsets except the two offsets selected as data input/output targets from among the four offsets Offset 0 to Offset 3.

Similarly, in order to input/output data in a unit smaller than the page unit, that is, in a unit of one offset, data may be inputted/outputted by selecting only one offset from among the four offsets Offset 0 to Offset 3. In this case, dummy data, data not selected as output targets, or invalid data may be stored in the remaining three offsets except the one offset selected as a data input/output target from among the four offsets Offset 0 to Offset 3.

After selecting some offsets from among the four offsets Offset 0 to Offset 3, the following schemes may be used to input/output data to/from the selected offsets. First, when storing data in some offsets selected from among the four offsets Offset 0 to Offset 3, the data is cached in offset page buffers corresponding to the selected offsets, among the four offset page buffers PB_Offset 0 to PB_Offset 3, and dummy data is cached in offset page buffers corresponding to the remaining unselected offsets. After that, all of the data and the dummy data cached in the four offset page buffers PB_Offset 0 to PB_Offset 3 are programmed to the four offsets Offset 0 to Offset 3.

Further, when outputting data from some offsets selected from among the four offsets Offset 0 to Offset 3, all data stored in the four offsets Offset 0 to Offset 3 are read and cached in the four offset page buffers PB_Offset 0 to PB_Offset 3. After that, data cached in offset page buffers corresponding to the selected offsets, among the four offset page buffers PB_Offset 0 to PB_Offset 3, are selected and outputted, and data cached in offset page buffers corresponding to the remaining unselected offsets are deleted without being outputted.

When an operation of inputting/outputting data in a unit smaller than the page unit, that is, in an offset unit, is performed in the memory device 150 as described above, whether data is valid or invalid may also be set in the offset unit.

Figure 5:
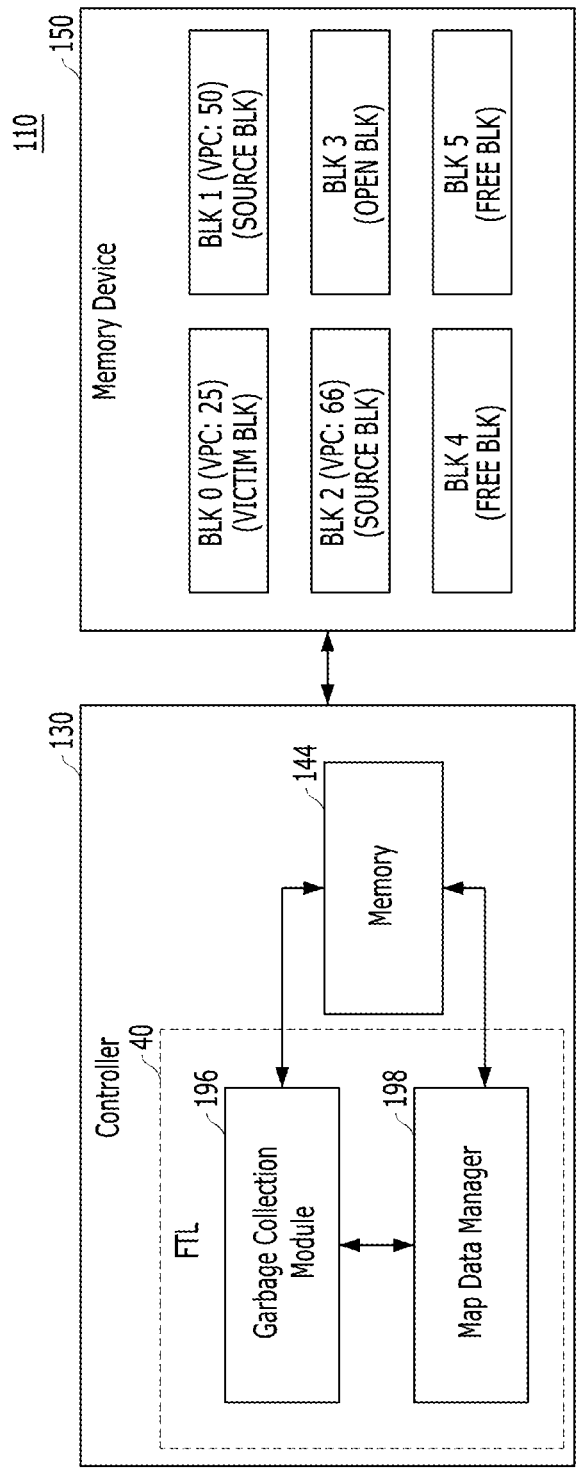
FIG. 5 a diagram illustrating an apparatus for performing a garbage collection operation in a memory system in accordance with an embodiment of the present disclosure.

FIG. 5 is a diagram illustrating an apparatus for performing a garbage collection operation in a memory system 110 in accordance with an embodiment of the present disclosure.

Before describing FIG. 5, it may be considered that, in the memory system described above with reference to FIGS. 1 to 4, as a throughput of a write or read command received from an external device or an internal device increases in the controller 130, data stored in memory blocks may be further dispersed and thus a fragmentation phenomenon may occur. Due to the data fragmentation, when the controller 130 receives a read request from the host 102 and performs a read operation accordingly, the read performance may be markedly degraded. In particular, when the controller 130 receives a read request for fragmented sequential data from the host 102 and performs a read operation accordingly, the read performance may be markedly degraded. This is because data corresponding to one sequence of logical addresses may not be sequentially stored in a memory region designated by one sequence of physical addresses. Therefore, the data should be read by searching for physical addresses respectively corresponding to the sequence of logical addresses. In this way, since the controller 130 performs several times an operation for reading the fragmented sequential data from the memory device 150, the read performance may be markedly degraded. In order to solve this problem, in an idle state in which there is no pending request issued by the host 102, the controller 130 may perform a garbage collection operation as a background operation and at the same time may perform a defragmentation on the fragmented sequential data, thereby improving the read performance.

The defragmentation indicates migrating data belonging to one sequence of logical addresses and dispersed in a memory region indicated by at least two sequences of physical addresses and thereby controlling the data belonging to one sequence of logical addresses to be stored in a memory region indicated by one sequence of physical addresses. In other words, when performing the garbage collection operation, the controller 130 may not only migrate valid data stored in valid offsets of a valid page to a destination block, but also predict data that had been stored in an invalid offset occurred due to fragmentation in the valid page, copy the predicted data from a memory region where the predicted data is stored, and migrate the predicted data to the destination block, thereby improving the read performance. The garbage collection module 196 and the map data manager 198 included in the controller 130, which perform operations related therewith, will be described below in detail.

Referring to FIG. 5, the memory system 110 may include the memory device 150 and the controller 130 which controls the memory device 150.

The memory device 150 may include a plurality of memory blocks. For example, the plurality of memory blocks may include a zeroth block BLK0 to a fifth block BLK5. The plurality of memory blocks may be divided into a free block, an open or active block, and a source block. The free block represents a memory block in which data is not stored. For example, among the plurality of memory blocks, the fourth block BLK4 and the fifth block BLK5 are free blocks. The open block represents a memory block in which an empty page still remains even though data is stored in the memory block. The empty page represents a page storing no data. For example, among the plurality of memory blocks, the third block BLK3 is an open block. The source block represents a memory block in which data is stored and an empty page is exhausted. That is to say, this means that an empty page does not exist in the source block. For example, among the plurality of memory blocks, the zeroth block BLK0, the first block BLK1, and the second block BLK2 are source blocks.

The controller 130 may include the garbage collection module 196, the map data manager 198, and the memory 144. The garbage collection module 196 and the map data manager 198 may be included in an FTL 40. The FTL 40 may be implemented by one or more processors.

When a garbage collection operation is performed, the memory 144 may be used to temporarily store valid data stored in valid offsets of a valid page included in a victim block and data corresponding to a logical address predicted using valid offsets adjacent to an invalid offset in the valid page.

In an embodiment, when performing the garbage collection operation, the garbage collection module 196 temporarily stores, in the memory 144, valid data stored in valid offsets of a valid page in a victim block and then migrates the valid data to a destination block. In addition, when there is an invalid offset occurred in the valid page due to fragmentation, the garbage collection module 196 searches for data that had been stored in the invalid offset and is now fragmented data stored in a different block from the victim block in which the invalid offset is included or stored in a different page in the victim block, stores the fragmented data in the memory 144, and then migrates the fragmented data to the destination block. By performing this, the read performance may be improved when a sequential read operation is performed in response to a sequential read request.

In detail, the garbage collection module 196 decides whether to enter a garbage collection mode based on a free block count (FBC) at each predetermined period. Namely, the controller 130 may decide whether to enter the garbage collection mode by checking whether the number of free blocks, i.e., the free block count (FBC), in the memory device 150 is equal to or less than a predetermined first threshold value TH1. The predetermined first threshold value TH1 is a minimum free block count for the controller 130 to determine a point of time when the controller 130 secures at least one free block. The predetermined first threshold value TH1 may be a value determined in advance, and the minimum free block count may be changed depending on an operating condition of the memory system 110. When the free block count (FBC) exceeds the first threshold value TH1 (i.e., FBC>TH1), the controller 130 does not enter the garbage collection mode.

On the other hand, when the garbage collection module 196 determines that the free block count (FBC) is equal to or less than the first threshold value TH1 (i.e., FBC<=TH1), an event for performing the garbage collection operation occurs, and thus the garbage collection module 196 may select at least one victim block from among a plurality of source blocks included in at least one die in order to perform the garbage collection operation. There are two methods to select a victim block. A first method is using a valid page count of each of the plurality of source blocks, and a second method is using an average valid page count for the plurality of source blocks. In the first method, the garbage collection module 196 may select, as a victim block, a source block whose valid page count is equal to or less than a predetermined second threshold value TH2, among the plurality of source blocks. In the second method, the garbage collection module 196 may set a second threshold value TH2' as the average valid page count of valid page counts of the plurality of source blocks, and may select a source block whose valid page count is equal to or less than the second threshold value TH2', as a victim block. In this embodiment, the valid page count of each source block represents the number of valid pages included in the source block.

In the present embodiment, a victim block is selected using the first method, e.g., based on a valid page count (VPC) of each source block and the predetermined second threshold value TH2. For example, referring to FIG. 5, when the garbage collection module 196 enters the garbage collection mode and the second threshold value TH2 for selecting a victim block is set to '30,' the zeroth block BLK0 may be selected as a victim block since the valid page count of the zeroth block BLK0 is 25, the valid page count of the first block BLK1 is 50, and the valid page count of the second block BLK2 is 66.

After selecting the victim block, the garbage collection module 196 sequentially checks whether each of a plurality of pages PAGE 0 to PAGE N (N is an integer) included in a source block selected as the victim block is a valid page. In order to check whether each of the plurality of pages PAGE 0 to PAGE N is a valid page, flag information (not illustrated) indicating the validity of each page may be used. That is to say, the flag information indicating the validity of each of the plurality of pages PAGE 0 to PAGE N may be represented by a single bit, and may be represented by '0' or '1.' For example, a page in which at least one valid offset is included may be represented by '0' as a valid page, and a page in which no valid offset is included may be represented by '1' as an invalid page. In this way, by managing the validity of each page using the flag information, the validity of each page may be quickly checked when the validity of each page needs to be checked during garbage collection. The flag information indicating the validity of each of the plurality of pages PAGE 0 to PAGE N may be stored in a reserved area of each page or in the memory 144.

In detail, in the case where an nth page is not a valid page, the garbage collection module 196 checks whether the nth page is the last page in the victim block, n being in a range of 0 to N. In the case where the nth page is not the last page, the garbage collection module 196 increases a page number for checking the validity by 1 and checks the validity of a next page. On the other hand, if it is determined that the nth page is a valid page, the garbage collection module 196 calculates an invalid offset ratio (IVOR) of the nth page that is determined as a valid page. The invalid offset ratio may be calculated by determining the number of invalid offsets among a plurality of offsets included in the nth page. Then, it is determined whether the calculated invalid offset ratio exceeds '0' and is equal to or less than a third threshold value TH3 (0<IVOR<=TH3). The reason for determining whether the invalid offset ratio of the nth page exceeds '0' and is equal to or less than the third threshold value TH3 is because, when the invalid offset ratio is '0' or exceeds the third threshold value TH3, only valid data stored in at least one valid offset included in the nth page may be stored in the memory 144. Namely, when the invalid offset ratio is '0' or exceeds the third threshold value TH3, it is not necessary to calculate a sequential ratio (SR) for the nth page. The invalid offset ratio (IVOR) may represent a ratio of the number of invalid offsets to the number of total offsets in each page.

When an invalid offset ratio of invalid offsets among a plurality of offsets included in a valid page exceeds the third threshold value TH3, it takes a lot of time to calculate a sequential ratio for searching for fragmented data related with the invalid offsets, and thus the garbage collection on the victim block cannot be efficiently performed. Meanwhile, when the invalid offset ratio of the valid page is '0,' there is no invalid offset in the valid page, and thus it is not necessary to calculate a sequential ratio for searching for data related with an invalid offset.

Next, if the invalid offset ratio of the nth page exceeds '0' and is equal to or less than the third threshold value TH3, the garbage collection module 196 requests calculation of a sequential ratio of the nth page and an expectation value corresponding to an invalid offset of the nth page, to the map data manager 198.

On the other hand, if the invalid offset ratio of the nth page is '0' or exceeds the third threshold value TH3, the garbage collection module 196 stores valid data, stored in a plurality of valid offsets included in the nth page, in the memory 144 without searching for fragmented data related with invalid offsets in the nth page.

When the garbage collection module 196 receives the sequential ratio of the nth page and the expectation value corresponding to the invalid offset from the map data manager 198, the garbage collection module 196 determines whether the sequential ratio of the nth page is equal to or higher than a predetermined fifth threshold value TH5 (i.e., SR>=TH5). As a result of the determination, in the case where the sequential ratio of the nth page is smaller than the predetermined fifth threshold value TH5 (i.e., SR<TH5), only valid data stored in the plurality of valid offsets of the nth page is copied to and stored in the memory 144. On the other hand, as a result of the determination, when the sequential ratio of the nth page is equal to or higher than the predetermined fifth threshold value TH5 (i.e., SR>=TH5), the expectation value corresponding to the invalid offset of the nth page may be predicted as a logical address for the invalid offset (hereinafter, a predicted logical address). The fact that the sequential ratio of the nth page is high may mean that it is highly probable that the valid data stored in the plurality of valid offsets of the nth page is sequential data. For this reason, data stored in the invalid offset adjacent to the plurality of valid offsets may also be determined to be sequential data related with the valid data stored in the valid offsets. In other words, it may be predicted that the expectation value of the invalid offset is a logical address of data that had been stored in the invalid offset before the offset is set as the invalid offset.

Next, the garbage collection module 196 identifies information on a location where valid data corresponding to the predicted logical address is stored, through a mapping table, and stores the valid data stored in the location, in the memory 144. Namely, the garbage collection module 196 identifies a physical address corresponding to the predicted logical address that is included in the mapping table, and stores data stored in a memory region indicated by the identified physical address, in the memory 144.

Here, referring to FIG. 8, the mapping table stores a plurality of logical addresses (LBA) and a plurality of physical addresses (PBA) corresponding thereto, and each physical address may include information on a block, a page, and an offset. The valid data corresponding to the predicted logical address may be stored in a valid page that is different from the nth page of the victim block or may be stored in another source block or an open block among a plurality of blocks except the victim block.

After migrating the fragmented data related with the nth page to the memory 144, the valid data stored in the plurality of valid offsets of the nth page are copied to and stored in the memory 144. Next, the garbage collection module 196 checks whether the nth page is the last page in the victim block. As a result of the checking, when the nth page is not the last page, the garbage collection module 196 increases the page number by 1 to check the validity of a next page in the victim block and perform the operations described above on the next page. On the other hand, when the nth valid page is the last page, the plurality of valid data stored in the memory 144 are sorted in the order (ascending order or descending order) of logical addresses corresponding to the valid data, and then, the sorted valid data are copied to and stored in the destination block.

Figure 6:
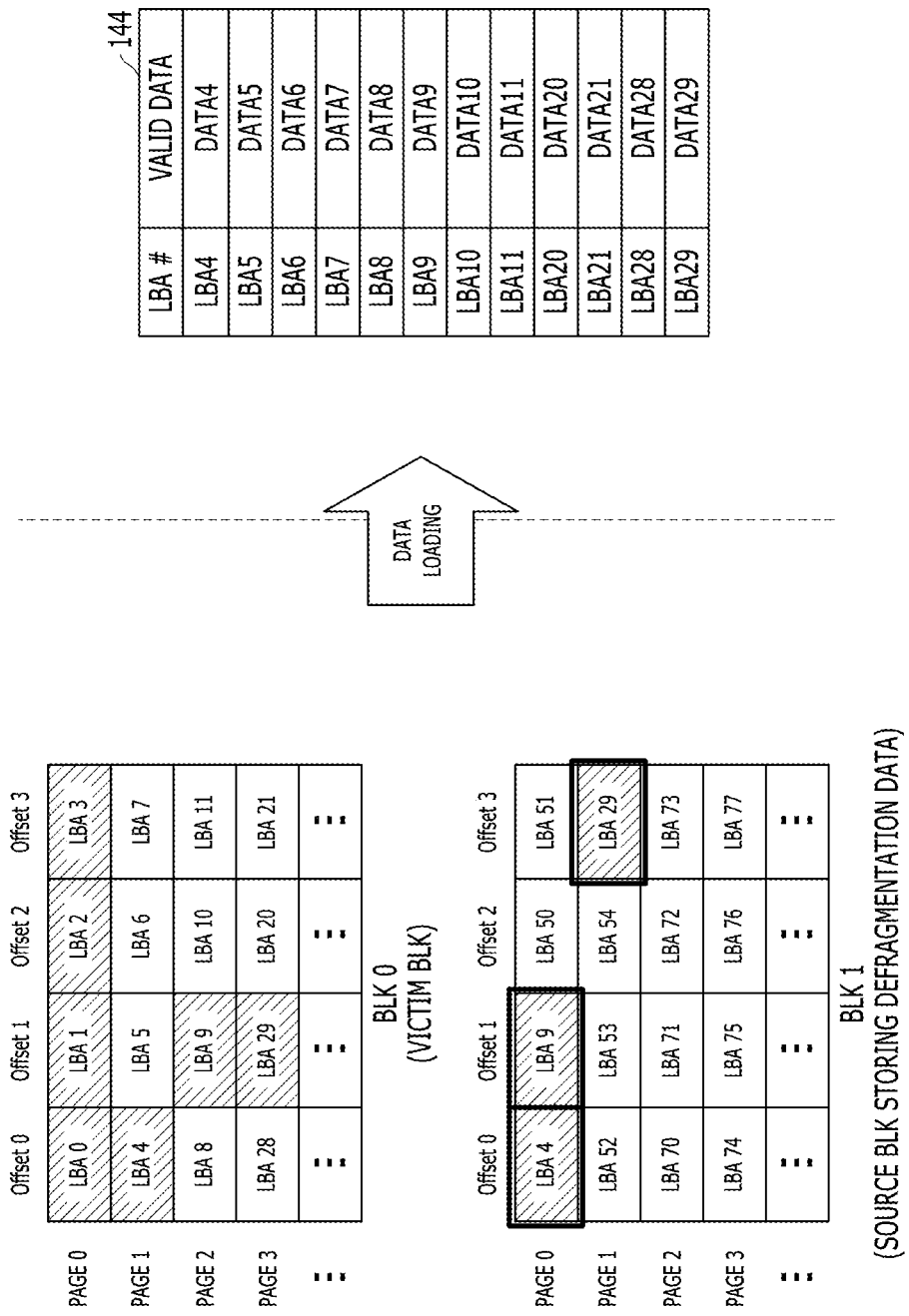

FIGS. 6 to 8 illustrate an operation of the garbage collection module 196 of FIG. 5 in accordance with an embodiment of the present disclosure.

Referring to FIGS. 6 to 8, the garbage collection module 196 sequentially checks the validity of a plurality of pages which are included in a zeroth block BLK0 selected as a victim block. That is to say, the garbage collection module 196 determines the zeroth page PAGE 0 of the zeroth block BLK0 as an invalid page because flag information thereof is '1' as a result of checking its validity. Then, the garbage collection module 196 checks whether the zeroth page PAGE 0 is the last page of the zeroth block BLK0. Since the zeroth page PAGE 0 is not the last page of the zeroth block BLK0, the garbage collection module 196 checks the validity of a next page, i.e., a first page PAGE 1, by increasing a page number by 1. The garbage collection module 196 determines the first page PAGE 1 as a valid page because flag information thereof is '0' as a result of checking the validity. Then, the garbage collection module 196 checks an invalid offset ratio IVOR of the first page PAGE 1. Referring to FIG. 6, because only one offset, i.e., a zeroth offset, among four offsets in the first page PAGE 1 is an invalid offset, the invalid offset ratio of the first page PAGE 1 is determined as 25%. Then, it is determined whether the invalid offset ratio IVOR of the first page PAGE 1 exceeds '0' and is equal to or less than the third threshold value TH3 (0<IVOR<=TH3). In the case where the third threshold value TH3 is set to 30%, since the invalid offset ratio IVOR is 25% and exists in a range between '0' and the third threshold value TH3, the garbage collection module 196 requests calculation of a sequential ratio of the first page PAGE 1 and an expectation value corresponding to the invalid offset, i.e., the zeroth offset, of the first page PAGE 1, to the map data manager 198.

When the garbage collection module 196 receives, from the map data manager 198, 75% as the sequential ratio of the first page PAGE 1 and 'LBA 4' as the expectation value of the invalid offset, i.e., the zeroth offset of the first page PAGE 1, the garbage collection module 196 first checks whether the sequential ratio of the first page PAGE 1 is equal to or higher than the fifth threshold value TH5. In the case where the fifth threshold value TH5 is set to 50%, because the sequential ratio of the first page PAGE 1 is 75%, it may be checked that the sequential ratio of the first page PAGE 1 is equal to or higher than the fifth threshold value TH5. Therefore, the expectation value, i.e., LBA 4, of the zeroth offset may be predicted as a predicted logical address of the zeroth offset. In other words, the predicted logical address of the zeroth offset may be set to 'LBA 4.' Next, the garbage collection module 196 checks a mapping table (see FIG. 8)

to identify a physical address corresponding to 'LBA 4' that is the predicted logical address of the zeroth offset of the first page PAGE 1. As a result of the checking, it may be identified that the physical address corresponding to LBA 4 is a zeroth offset of a zeroth page PAGE 0 of a first block BLK1. Therefore, data stored in the zeroth offset of the zeroth page PAGE 0 of the first block BLK1 identified in this way is stored in the memory 144 included in the controller 130. The data stored in the zeroth offset of the zeroth page PAGE 0 of the first block BLK1 is identified as fragmented data related with the zeroth offset of the first page PAGE 1 in the zeroth block BLK0.

In the same manner as described above, since sequential ratios of a second page PAGE 2 and a third page PAGE 3 in the zeroth block BLK0 are determined to be equal to or higher than the fifth threshold value TH5, expectation values corresponding to invalid offsets included in the second page PAGE 2 and the third page PAGE 3 of the zeroth block BLK0 are set as predicted logical addresses thereof. Referring to FIG. 6, the predicted logical addresses of the second page PAGE 2 and the third page PAGE 3 of the zeroth block BLK0 are 'LBA9' and 'LBA29,' respectively. Physical addresses corresponding to LBA9 and LBA29 are identified as a first offset of the zeroth page PAGE 0 and a third offset of a first page PAGE 1 of the first block BLK1, respectively.

By identifying the physical addresses from the mapping table based on the predicted logical addresses, data stored in memory regions corresponding to the physical addresses are stored in the memory 144 as fragmented data. As such, if the above-described operation is completed up to the last valid page in the zeroth block BLK0, the garbage collection module 196 sequentially sorts all valid data stored in the memory 144 based on the predicted logical addresses corresponding to the valid data. Then, as illustrated in FIG. 7, the garbage collection module 196 sequentially migrates the sequentially sorted valid data stored in the memory 144 to a fourth block BLK4 that is selected as a destination block.

When the map data manager 198 receives a request for the calculation of a sequential ratio of a valid page from the garbage collection module 196, the map data manager 198 calculates the sequential ratio of the valid page using expectation values corresponding to a plurality of offsets included in the valid page, and transfers the sequential ratio to the garbage collection module 196 as a response to the request. The calculated sequential ratio of the valid page may be stored in the memory 144.

In detail, the map data manager 198 first sets a logical address of any one valid offset of a plurality of valid offsets, as a reference value, in order to calculate the expectation values of the plurality of offsets included in the valid page. A default value of the reference value may be set as a logical address of a first valid offset among the plurality of valid offsets or may be a logical address of a first valid offset among valid offsets sequentially arranged among the plurality of valid offsets. For the sake of convenience in explanation of the disclosure, the default value of the reference value is set as the logical address of the first valid offset among the plurality of valid offsets. The reference value may be changed to a logical address of another valid offset in the case where a predicted sequential ratio calculated subsequently is not included in a predetermined threshold range. In the present disclosure, when it is necessary to change the reference value, the reference value may be changed to a logical address of another valid offset selected according to an arrangement order of the plurality of valid offsets. Namely, in the case where a currently set reference value, i.e., a current reference value, is the logical address of the first valid offset among the plurality of valid offsets, a logical address of a second valid offset among the plurality of valid offsets may be set as a next reference value.

After setting the reference value, the map data manager 198 may set the expectation values corresponding to the plurality of offsets based on the reference value. The expectation values corresponding to the plurality of offsets may be a sequence of logical addresses sequentially allocated to the plurality of offsets based on the reference value.

Next, the map data manager 198 calculates the predicted sequential ratio of the valid page by checking whether the expectation values of the plurality of valid offsets coincide with logical addresses (hereinafter, actual logical addresses) corresponding to the valid data stored in the plurality of valid offsets. The map data manager 198 determines a consistency by checking whether the expectation value and the actual logical address of each valid offset coincide with each other. For example, the map data manager 198 may represent a consistency as '0' when the expectation value and the actual logical address of each valid offset coincide with each other and as '1' when the expectation value and the actual logical address of each valid offset do not coincide with each other. The map data manager 198 calculates the predicted sequential ratio of the valid page using the consistencies of the respective valid offsets. The predicted sequential ratio may be determined as a ratio of the number of consistencies having '0' to the number of offsets in the valid page.

The map data manager 198 checks whether the calculated predicted sequential ratio is equal to or higher than a predetermined fourth threshold value TH4. As a result of the checking, in the case where the predicted sequential ratio is equal to or higher than the predetermined fourth threshold value TH4, the map data manager 198 determines that the valid data stored in the valid page are highly probable to be sequential data, and thereby, sets the predicted sequential ratio as the sequential ratio of the valid page. On the other hand, in the case where the predicted sequential ratio is lower than the predetermined fourth threshold value TH4, the map data manager 198 determines that the valid data stored in the valid page are less probable to be sequential data, and thereby, calculates a predicted sequential ratio for the valid page again by re-setting the reference value. In the case where the reference value is set as the logical address of the last one of the valid offsets, a lastly calculated predicted sequential ratio is set as the sequential ratio of the valid page.

FIG. 9(a) and FIG. 9(b) illustrate an operation of the map data manager 198 of FIG. 5 in accordance with an embodiment of the present disclosure. FIG. 9(a) illustrates a case where a predicted sequential ratio of a valid page is equal to or higher than the predetermined fourth threshold value TH4, and FIG. 9(b) illustrates a case where a predicted sequential ratio of a valid page is lower than the predetermined fourth threshold value TH4 and thus a predicted sequential ratio is re-calculated by re-setting a reference value.

First, referring to FIG. 9(a), a plurality of valid offsets included in a first page PAGE 1 that is a valid page may include a first offset Offset 1, a second offset Offset 2, and a third offset Offset 3. The map data manager 198 may set, as a reference value, 'LBA5' that is a logical address of the first offset Offset 1, the first offset Offset 1 being a first one of the plurality of valid offsets. When the map data manager 198 sets expectation values corresponding to a zeroth offset Offset 0 to the third offset Offset 3 based on the reference value, i.e., 'LBA 5' of the first offset Offset 1, the expectation value of the zeroth offset Offset 0 may become 'LBA 4,' the expectation value of the first offset Offset 1 may become 'LBA 5' (the reference value), the expectation value of the second offset Offset 2 may become 'LBA 6,' and the expectation value of the third offset Offset 3 may become 'LBA 7.'

Figure 9:
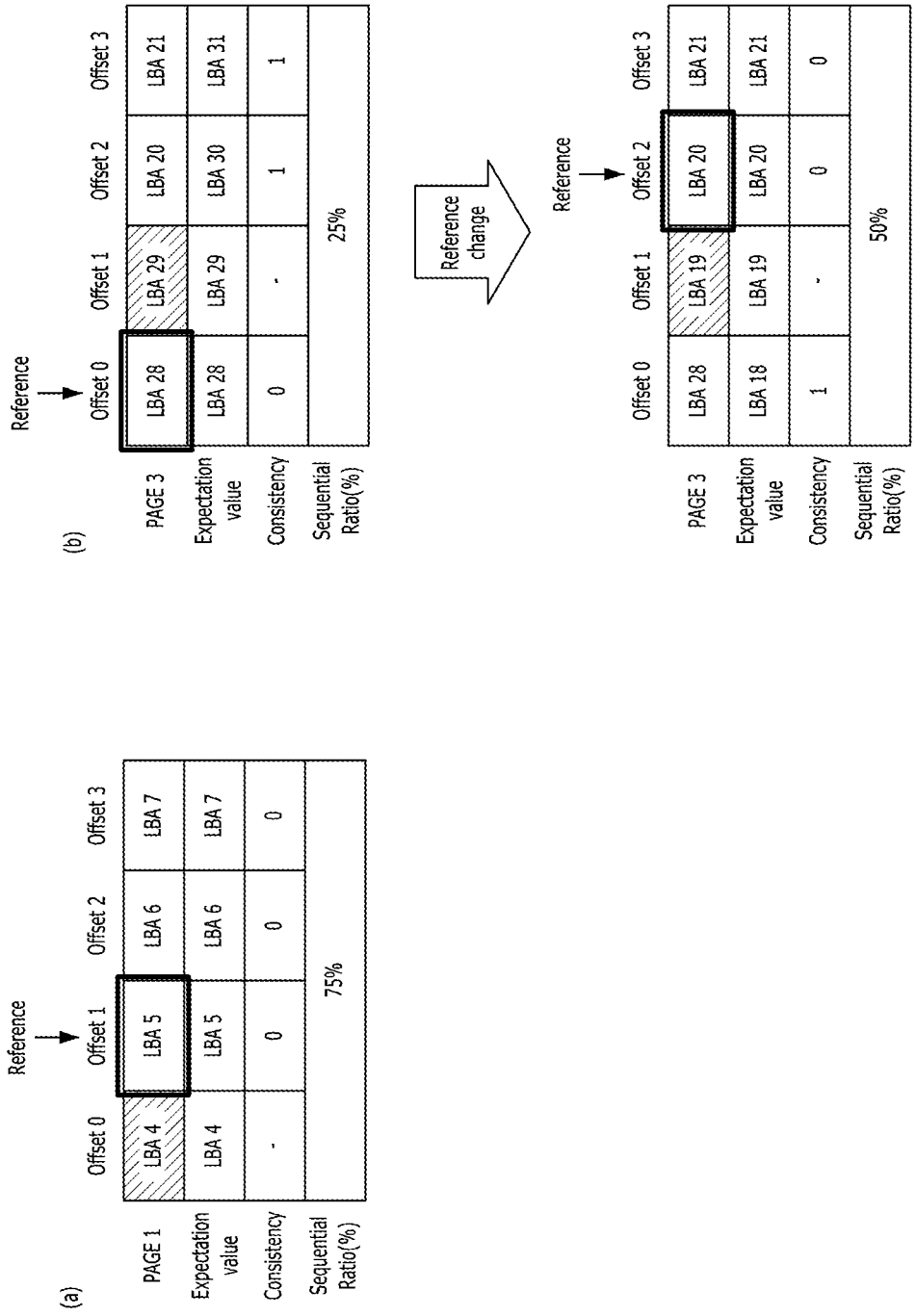
FIG. 9 illustrates an operation of a map data manager in accordance with an embodiment of the present disclosure.

Next, in order to determine a consistency of the first offset Offset 1, the expectation value and an actual logical address of the first offset Offset 1 are compared with each other. Referring to FIG. 9(*a*), since the expectation value of the first offset Offset 1 is 'LBA 5' and the actual logical address of the first offset Offset 1 is 'LBA 5,' they coincide with each other. Therefore, the consistency of the first offset Offset 1 may be '0.' Also, since the expectation value of the second offset Offset 2 is 'LBA 6' and an actual logical address of the second offset Offset 2 is 'LBA 6,' they coincide with each other. Therefore, the consistency of the second offset Offset 2 may be '0.' Further, since the expectation value of the third offset Offset 3 is 'LBA 7' and an actual logical address of the third offset Offset 3 is 'LBA 7,' they coincide with each other. Therefore, the consistency of the third offset Offset 3 may be '0.' Because the expectation values and the actual logical addresses of the three valid offsets among the four offsets coincide with each other, a predicted sequential ratio of the valid page becomes 75%.

Next, it is checked whether the predicted sequential ratio of the first page PAGE 1 is equal to or higher than the fourth threshold value TH4. For example, descriptions will be made by setting the predetermined fourth threshold value TH4 to 50%. Since the predicted sequential ratio of the first page PAGE 1 is 75%, the predicted sequential ratio of the first page PAGE 1 is higher than the fourth threshold value TH4 that is 50%. Therefore, the predicted sequential ratio of the first page PAGE 1 may be set as a sequential ratio of the first page PAGE 1. The map data manager 198 transmits the calculated sequential ratio of the first page PAGE 1 to the garbage collection module 196.

Referring to FIG. 9(*b*), in the case where a third page PAGE 3 is a valid page, a plurality of valid offsets included in the third page is PAGE 3 may include a zeroth offset Offset 0, a second offset Offset 2, and a third offset Offset 3. The map data manager 198 may set, as a reference value, 'LBA28' that is a logical address of the zeroth offset Offset 0, the zeroth offset Offset 0 being a first one of the plurality of valid offsets. When the map data manager 198 sets expectation values corresponding to the zeroth offset Offset 0 to the third offset Offset 3 based on the reference value, i.e., 'LBA 28' of the zeroth offset Offset 0, the expectation value of the zeroth offset Offset 0 may become 'LBA 28' (the reference value), the expectation value of the first offset Offset 1 may become 'LBA 29,' the expectation value of the second offset Offset 2 may become 'LBA 30,' and the expectation value of the third offset Offset 3 may become 'LBA 31.'

Next, in order to determine consistencies of the plurality of offsets, the expectation value and an actual logical address of the zeroth offset Offset 0 are compared with each other. Referring to FIG. 9(*b*), since the expectation value of the zeroth offset Offset 0 is 'LBA 28' and the actual logical address of the zeroth offset is 'LBA 28,' they coincide with each other. Therefore, the consistency of the zeroth offset Offset 0 may be '0.' Since the expectation value of the second offset Offset 2 is 'LBA 30' and an actual logical address of the second offset Offset 2 is 'LBA 20,' they do not coincide with each other. Therefore, the consistency of the second offset Offset 2 may be '1.' Since the expectation value of the third offset Offset 3 is 'LBA 31' and an actual logical address of the third offset Offset 3 is 'LBA 21,' they do not coincide with each other. Therefore, the consistency of the third offset Offset 3 may be '1.' Because the expectation value and the actual logical address of the one valid offset among the four offsets coincide with each other, a predicted sequential ratio of the valid page PAGE 3 becomes 25%.

Next, it is checked whether the predicted sequential ratio of the third page PAGE 3 is equal to or higher than the fourth threshold value TH4. As described above with reference to FIG. 9(*a*), when the predetermined fourth threshold value TH4 is set to 50%, since the predicted sequential ratio of the third page PAGE 3, i.e., 25%, is lower than the fourth threshold value TH4, it is checked whether the zeroth offset Offset 0 set as the reference value of the third page PAGE 3 is the last valid offset among the plurality of valid offsets in order to re-set the reference value of the third page PAGE 3. Because the zeroth offset Offset 0 is not the last valid offset, the reference value is changed to the logical address of the second offset Offset 2 which is a second valid offset among the plurality of valid offsets.

The map data manager 198 sets expectation values corresponding to the zeroth offset Offset 0 to the third offset Offset 3 based on the new reference value, i.e., 'LBA 20' of the second offset Offset 2. As a result, the expectation value of the zeroth offset Offset 0 may become 'LBA 18,' the expectation value of the first offset Offset 1 may become 'LBA 19,' the expectation value of the second offset Offset 2 may become 'LBA 20' (the reference value), and the expectation value of the third offset Offset 3 may become 'LBA 21.'

Next, in order to determine consistencies of the plurality of offsets, the expectation value and the actual logical address of the zeroth offset Offset 0 are compared with each other. Since the expectation value of the zeroth offset Offset 0 is 'LBA 18' and the actual logical address of the zeroth offset is 'LBA 28,' they do not coincide with each other. Therefore, the consistency of the zeroth offset may be '1.' Since the expectation value of the second offset Offset 2 is 'LBA 20' and an actual logical address of the second offset Offset 2 is 'LBA 20,' they coincide with each other. Therefore, the consistency of the second offset Offset 2 may be '0.' Further, since the expectation value of the third offset Offset 3 is 'LBA 21' and an actual logical address of the third offset Offset 3 is 'LBA 21,' they coincide with each other. Therefore, the consistency of the third offset Offset 3 may be '0.' Because the expectation values and the actual logical addresses of the two valid offsets among the four offsets coincide with each other, a predicted sequential ratio of the valid page PAGE 3 is 50%.

Next, it is checked whether the predicted sequential ratio of the third page PAGE 3 is equal to or higher than the fourth threshold value TH4. As a result of comparing the predicted sequential ratio of the third page PAGE 3 with the predetermined fourth threshold value TH4, since the predicted sequential ratio of the third page PAGE 3 is equal to the fourth threshold value TH4, the predicted sequential ratio of the third page PAGE 3 is set as a sequential ratio of the third page PAGE 3. The map data manager 198 transmits the set sequential ratio of the third page PAGE 3 to the garbage collection module 196.

Figure 10:
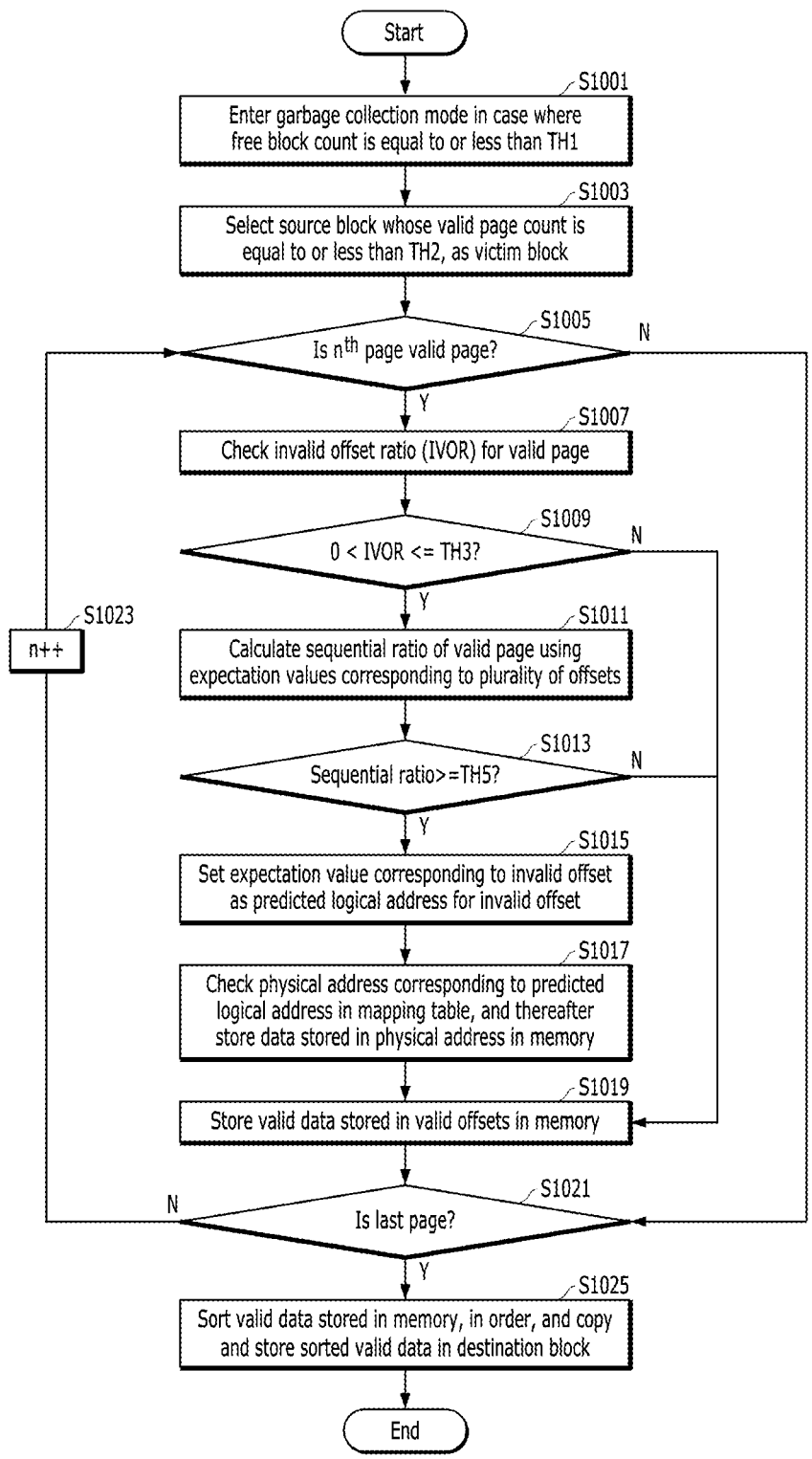
FIG. 10 is a flow chart describing a method of operating a memory system in accordance with an embodiment of the present disclosure.

FIG. 10 is a flow chart describing a method of operating a memory system in accordance with an embodiment of the present disclosure. The method shown in FIG. 10 will be described with reference to the memory system illustrated in FIGS. 1 and 5.

Referring to FIG. 10, at S1001, the garbage collection module 196 of the controller 130 decides whether to enter a garbage collection mode based on a free block count (FBC) at each predetermined period. Namely, the garbage collection module 196 may decide whether to enter the garbage collection mode by checking whether the free block count (FBC) is equal to or less than the predetermined first threshold value TH1. The predetermined first threshold value TH1 is a minimum free block count for the controller 130 to determine a point of time when the controller 130 secures at least one free block. The predetermined first threshold value TH1 may be a value determined in advance, and the minimum free block count may be changed depending on an operating condition of the memory system 110.

As a result of the checking, when the free block count (FBC) exceeds the first threshold value TH1 (FBC>TH1), the controller 130 does not enter the garbage collection mode, and the garbage collection module 196 may decide whether to enter the garbage collection mode again at another predetermined period.

On the other hand, when the free block count (FBC) is equal to or less than the first threshold value TH1 (FBC<=TH1), an event for performing a garbage collection operation occurs, and thus the garbage collection module 196 may select a victim block from among a plurality of source blocks at S1003.

At S1003, if the event for entering the garbage collection mode occurs, the garbage collection module 196 may select at least one victim block from among the plurality of source blocks included in at least one die. Among the plurality of source blocks, a source block whose valid page count is equal to or less than the predetermined second threshold value TH2 may be selected as the victim block. There are two methods to select the victim block. A first method may correspond to a case where the second threshold value TH2 is set as a predetermined valid page count, and a second method may correspond to a case where the second threshold value TH2 is set as an average valid page count for the plurality of source blocks.

First, the controller 130 may select, from among the plurality of source blocks, a source block having a valid page count that is equal to or less than the predetermined valid page count, as the victim block. Next, in the case where the second threshold value TH2 is set as the average valid page count, the controller 130 may calculate the average valid page count using a valid page count of each of the plurality of source blocks. The controller 130 may set the calculated average valid page count as the second threshold value TH2, and thereby, may select, as the victim block, a source block whose valid page count is equal to or less than the average valid page count. In FIG. 10, a victim block is selected based on the predetermined valid page count according to the first method.

At S1005, after selecting the victim block, the garbage collection module 196 sequentially checks whether each of a plurality of pages PAGE 0 to PAGE N (N is an integer) included in the source block selected as the victim block is a valid page. In order to check whether each of the plurality of pages PAGE 0 to PAGE N is a valid page, flag information indicating the validity of each page may be used. That is to say, the flag information indicating the validity of each of the plurality of pages PAGE 0 to PAGE N may be represented by a single bit, and may be represented by '0' or '1.' For example, a page in which at least one valid offset is included may be represented by '0' as a valid page, and a page in which no valid offset is included may be represented by '1' as an invalid page. In this way, by managing the validity of each page using the flag information, the validity of each page may be quickly checked when it is necessary to check the validity of each page during garbage collection. The flag information indicating the validity of each of the plurality of pages PAGE 0 to PAGE N may be stored in a reserved area of each page or in the memory 144.

As a result of the checking at S1005, in the case where an nth page is not a valid page (NO), at S1021, the garbage collection module 196 checks whether the nth page is the last page in the victim block. If it is determined at S1021 that the nth page is not the last page, the garbage collection module 196 increases the page number by 1 (n++) at S1023 and checks the validity of a next page at S1005.

On the other hand, as a result of the checking at S1005, in the case where the nth page is a valid page (YES), at S1007, the garbage collection module 196 calculates or determines an invalid offset ratio IVOR of the valid page. The invalid offset ratio IVOR may be calculated using an invalid offset count among a plurality of offsets included in the valid page.

After that, at S1009, the garbage collection module 196 determines that the invalid offset ratio IVOR exceeds '0' and is equal to or less than a third threshold value TH3 (i.e., 0<IVOR<=TH3). As a result of determination at S1009, if the invalid offset ratio IVOR of the valid page is '0' or exceeds the third threshold value TH3 (NO), the garbage collection module 196 stores valid data stored in a plurality of valid offsets included in the valid page, in the memory 144.

On the other hand, at S1009, it is determined that the invalid offset ratio IVOR of the valid page exceeds '0' and is equal to or less than the third threshold value TH3 (YES), at S1011, the garbage collection module 196 requests the map data manager 198 to calculate a sequential ratio SR of the valid page using expectation values corresponding to the plurality of offsets of the valid page. This will be described later in detail with reference to FIG. 11.

At S1013, the garbage collection module 196 determines whether the sequential ratio SR of the valid page is equal to or higher than the predetermined fifth threshold value TH5 (i.e., SR>=TH5). As a result of the determination at S1013, in the case where the sequential ratio SR of the valid page is smaller than the predetermined fifth threshold value TH5 (NO), only valid data stored in the plurality of valid offsets of the valid page is stored in the memory 144. On the other hand, as a result of the determination at S1013, in the case where the sequential ratio SR of the valid page is equal to or higher than the predetermined fifth threshold value TH5 (YES), at S1015, an expectation value corresponding to an invalid offset of the valid page is generated as a predicted logical address for the invalid offset. The predicted logical address means a logical address corresponding to a memory region where fragmented data is now stored, the fragmented data representing data that had been stored in the invalid offset. The fact that the sequential ratio SR of the valid page is high may mean that the valid data stored in the plurality of valid offsets of the valid page are highly probable to be sequential data. For this reason, the data that had been stored in the invalid offset adjacent to the plurality of valid offsets may be determined to be sequential data with the valid data stored in the valid offsets. In other words, the expectation value of the invalid offset may be a logical address corresponding to a memory region where data, which had been stored in the invalid offset before the invalid offset is set, is stored now.

At S1017, the garbage collection module 196 identifies a physical address corresponding to the predicted logical address of the valid page, in a mapping table, and then, stores data stored in a memory region corresponding to the physical address, in the memory 144.

At S1019, the garbage collection module 196 copies and stores valid data stored in the plurality of valid offsets of the valid page, to and in the memory 144.

At S1021, the garbage collection module 196 checks whether the valid page is the last page of the victim block. As a result of the checking at S1021, in the case where the valid page is not the last page (NO), the garbage collection module 196 increases the page number by 1 at S1023, and checks the validity of a next page at S1005. On the other hand, as a result of the checking at S1021, in the case where the valid page is the last page (YES), at S1025, the garbage collection module 196 sorts valid data stored in the memory 144 in the order (ascending order or descending order) of logical addresses corresponding to the valid data, copies and stores the sorted valid data to and in a destination block. When the data storage operation is completed, the garbage collection module 196 ends the garbage collection mode. The destination block may be any one of a plurality of free blocks. The garbage collection module 196 may select, as the destination block, a free block having the smallest write/erase (P/E) cycle count from among the plurality of free blocks.

Figure 11:
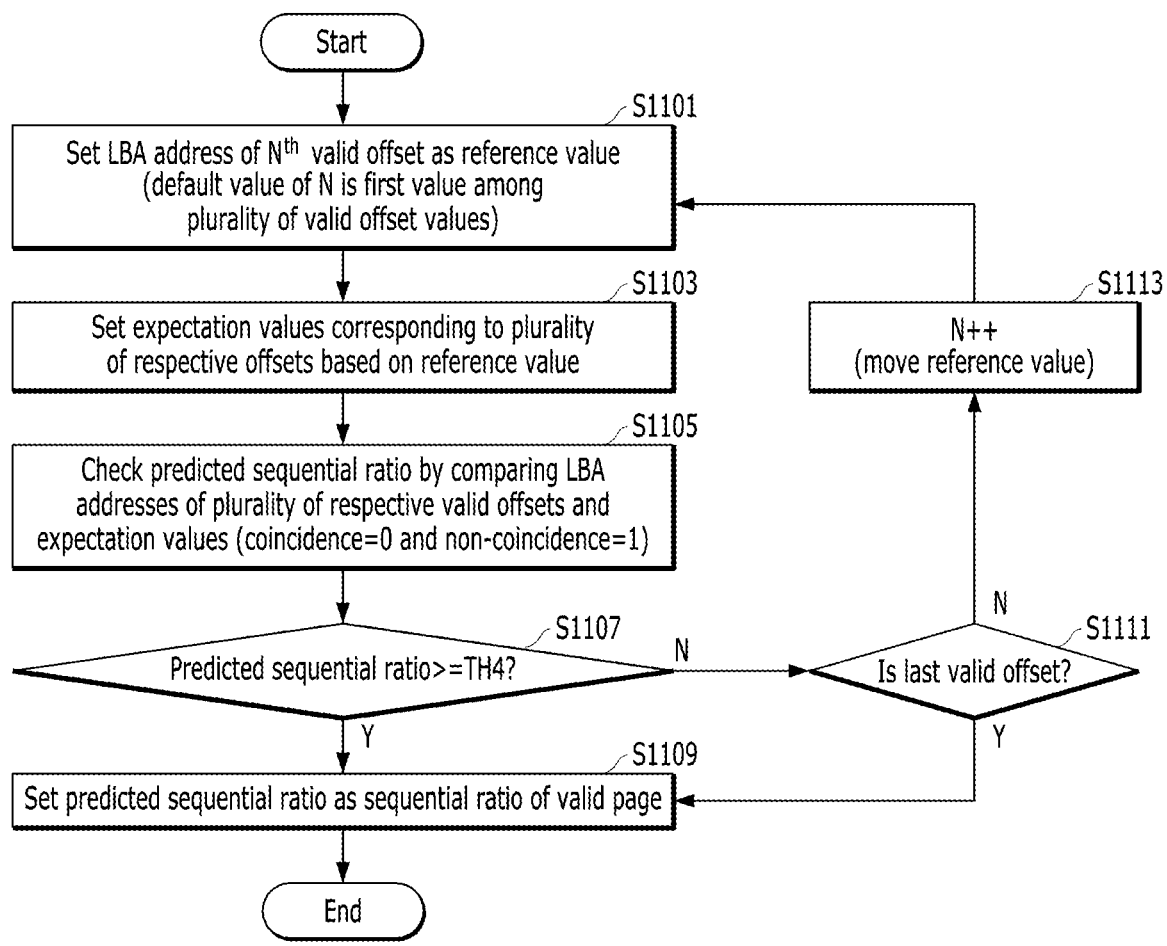
FIG. 11 is a flow chart describing a method of calculating a sequential ratio of a valid page in accordance with an embodiment of the present disclosure.

FIG. 11 is a flow chart describing a method of calculating a sequential ratio of a valid page in accordance with an embodiment of the present disclosure. FIG. 11 describes in detail S1011 of FIG. 10.

Referring to FIG. 11, at S1101, the map data manager 198 of the controller 130 sets a logical address of one of the plurality of valid offsets included in the valid page, as a reference value. The reference value of the valid page may be set to calculate expectation values corresponding to the plurality of offsets in the valid page, respectively. A default value of the reference value may be set as a logical address of a first valid offset among the plurality of valid offsets or may be a logical address of a first valid offset among valid offsets sequentially arranged among the plurality of valid offsets.

For the sake of convenience in explanation of the disclosure, the default value of the reference value is set as the logical address of the first valid offset among the plurality of valid offsets. The reference value may be changed to a logical address of another valid offset when a predicted sequential ratio calculated using the reference value is not included in a predetermined threshold range. In the present disclosure, when it is necessary to change the reference value, the reference value may be changed in the arrangement order of the plurality of valid offsets. Namely, when a currently set reference value is the logical address of the first valid offset among the valid offsets, a logical address of a second valid offset which exists next to the first valid offset may be set as a next reference value.

At S1103, the map data manager 198 may set the expectation values corresponding to the plurality of offsets, respectively, based on the reference value. The expectation values respectively corresponding to the plurality of offsets represent sequential logical addresses which are respectively allocated to the plurality of offsets based on the reference value.

At S1105, the map data manager 198 calculates the predicted sequential ratio of the valid page by checking whether the expectation values of the plurality of valid offsets coincide with actual logical addresses corresponding to the valid data stored in the plurality of valid offsets. For example, the map data manager 198 may represent a consistency as '0' when the expectation value and the logical address of each valid offset coincide with each other, and the consistency as '1' when the expectation value and the logical address of each valid offset do not coincide with each other. The map data manager 198 calculates the predicted sequential ratio of the valid page using the consistencies of the respective valid offsets.

At S1107, the controller 130 checks whether the calculated predicted sequential ratio is equal to or higher than the predetermined fourth threshold value TH4. As a result of the checking at S1107, in the case where the predicted sequential ratio is equal to or higher than the predetermined fourth threshold value TH4 (YES), at S1109, the map data manager 198 determines that the valid data stored in the valid page are highly probable to be sequential data, and thereby, sets the predicted sequential ratio as the sequential ratio of the valid page.

On the other hand, as a result of the checking at S1107, in the case where the predicted sequential ratio is lower than the predetermined fourth threshold value TH4 (NO), the map data manager 198 determines that the valid data stored in the valid page are less probable to be sequential data, and, at S1111, checks whether the valid offset of the current reference value of the valid page is the last valid offset. As a result of checking at S1111, if the valid offset of the current reference value is not the last valid offset, at S1113, a movement is made to a valid offset next to the valid offset of the current reference value. Then, at S1101, the map data manager 198 sets a logical address of the next valid offset as a next reference value to calculate a predicted sequential ratio of the valid page again. On the other hand, as a result of the checking at S1111, if the valid offset of the current reference value is the last valid offset, at S1109, the lastly calculated predicted sequential ratio is set as the sequential ratio of the valid page, and the process goes to S1010 of FIG. 10.

Although various embodiments have been described for illustrative purposes, it will be apparent to those skilled in the art that various changes and modifications may be made without departing from the spirit and scope of the disclosure as defined in the following claims.

What is claimed is:

1. A memory system comprising:
a plurality of memory blocks each including a plurality of pages, each of the plurality of pages including a plurality of offsets; and
a controller including a memory, and configured to perform a garbage collection operation on a victim block using the memory,
wherein the controller selects the victim block from among the plurality of memory blocks, calculates an invalid offset ratio by checking whether an invalid offset exists among a plurality of offsets in a valid page included in the victim block, and, when the invalid offset ratio is included in a predetermined threshold range, calculates a sequential ratio of the valid page, predicts a logical address of the invalid offset depending on the sequential ratio, and stores, in the memory, valid data stored in a plurality of valid offsets in the valid page and valid data stored in a memory region corresponding to the predicted logical address, the sequential ratio of the valid page being calculated using expectation values corresponding to the plurality of offsets in the valid page.

2. The memory system according to claim 1, wherein, in the case where the invalid offset ratio of the valid page is out of the predetermined threshold range, the controller stores only the valid data stored in the plurality of valid offsets included in the valid page in the memory.

3. The memory system according to claim 1, wherein the controller sets a logical address corresponding to one of the plurality of valid offsets in the valid page, as a reference value, and sets the expectation values of the plurality of offsets in the valid page by allocating sequential logical addresses to the plurality of offsets, respectively, using the reference value.

4. The memory system according to claim 3,
wherein the controller checks whether a logical address corresponding to each of the plurality of valid offsets coincides with an expectation value of said each of the plurality of valid offsets, and
wherein the controller calculates a predicted sequential ratio of the valid page based on a number of valid offsets whose logical addresses and expectation values coincide with each other.

5. The memory system according to claim 4,
wherein the controller determines whether the predicted sequential ratio is equal to or higher than a predetermined threshold value,
wherein, in the case where the predicted sequential ratio is equal to or higher than the predetermined threshold value, the controller sets the predicted sequential ratio as the sequential ratio of the valid page, and
wherein, in the case where the predicted sequential ratio is smaller than the predetermined threshold value, the controller checks whether the reference value is set as a logical address of a last valid offset among the plurality of valid offsets, and, in the case where the reference value is set as the logical address of the last valid offset, the controller sets the predicted sequential ratio as the sequential ratio of the valid page.

6. The memory system according to claim 5, wherein, in the case where the reference value is not set as the logical address of the last valid offset among the plurality of valid offsets, the controller re-calculates the predicted sequential ratio of the valid page by re-setting the reference value using a logical address of a valid offset that is different from the valid offset used to set a previous reference value.

7. The memory system according to claim 1, wherein the controller determines whether to predict the logical address corresponding to the invalid offset included in the valid page when the sequential ratio of the valid page is equal to or higher than a predetermined threshold value.

8. The memory system according to claim 7,
wherein, in the case where the sequential ratio of the valid page is equal to or higher than the predetermined threshold value, the controller predicts the expectation value corresponding to the invalid offset of the valid page, as the logical address of the invalid offset, and
wherein, in the case where the sequential ratio of the valid page is smaller than the predetermined threshold value, the controller stores only the valid data stored in the plurality of valid offsets of the valid page, in the memory.

9. The memory system according to claim 1, wherein, based on the predicted logical address of the invalid offset, the controller identifies information on a location where valid data corresponding to the predicted logical address is stored, from a mapping table, and stores the valid data corresponding to the predicted logical address in the memory.

10. The memory system according to claim 9, wherein the valid data corresponding to the predicted logical address is stored in another valid page different from the valid page in which the invalid offset is included among the plurality of valid pages of the victim block, or is stored in a source block or an open block among a plurality of memory blocks except the victim block.

11. The memory system according to claim 1, wherein the controller sequentially sorts valid data stored in the memory based on logical addresses corresponding to the valid data, and stores sorted valid data in a destination block.

12. A method for operating a memory system including a plurality of memory blocks and a controller for controlling a garbage collection operation on the plurality of memory blocks, the method comprising:
selecting a victim block from among the plurality of memory blocks;
calculating an invalid offset ratio by checking whether an invalid offset is included in a plurality of offsets configuring a valid page included in the victim block;
setting expectation values corresponding to the plurality of offsets when the invalid offset ratio is included in a predetermined threshold range;
calculating a sequential ratio of the valid page using expectation values of a plurality of valid offsets among the plurality of offsets;
predicting, in the case where the sequential ratio of the valid page is equal to or higher than a predetermined threshold value, an expectation value corresponding to an invalid offset among the expectation values corresponding to the plurality of offsets, as a logical address of the invalid offset; and
storing valid data stored in a memory region corresponding to the predicted logical address and valid data stored in the plurality of valid offsets, in a destination block.

13. The method according to claim 12, further comprising:
storing, in the case where the invalid offset ratio of the valid page is out of the predetermined threshold range, only the valid data stored in the plurality of valid offsets in the destination block.

14. The method according to claim 12, wherein the invalid offset ratio is calculated using an invalid offset count among the plurality of offsets included in the valid page.

15. The method according to claim 12, wherein the setting of the expectation values corresponding to the plurality of offsets comprises:
setting a logical address of one of the plurality of valid offsets, as a reference value; and
setting the expectation values of the plurality of offsets by allocating sequential logical addresses to the plurality of offsets, respectively, based on the reference value.

16. The method according to claim 12, wherein the calculating of the sequential ratio of the valid page comprises:
checking whether a logical address corresponding to each of the plurality of valid offsets coincides with an expectation value of said each of the plurality of valid offsets;
calculating a predicted sequential ratio based on a number of valid offsets whose logical addresses and expectation values coincide with each other;
determining whether the predicted sequential ratio is equal to or higher than a predetermined threshold value; and
setting, in the case where the predicted sequential ratio is equal to or higher than the predetermined threshold value, the predicted sequential ratio as the sequential ratio of the valid page.

17. The method according to claim 16, further comprising:
checking, in the case where the predicted sequential ratio is smaller than the predetermined threshold value, whether the reference value is set as a logical address of a last valid offset among the plurality of valid offsets;
setting, in the case where the reference value is set as the logical address of the last valid offset among the plurality of valid offsets, the predicted sequential ratio as the sequential ratio of the valid page; and
in the case where the reference value is not set as the logical address of the last valid offset among the plurality of valid offsets, re-calculating a predicted sequential ratio of the valid page by re-setting the reference value using a logical address of a valid offset that is different from the valid offset used to set a previous reference value.

18. The method according to claim 12, wherein, in the case where the sequential ratio of the valid page is smaller than the predetermined threshold value, only the valid data stored in the plurality of valid offsets of the valid page are stored in a memory of the controller.

19. The method according to claim 12, wherein the valid data corresponding to the logical address predicted with respect to the invalid offset is stored in another valid page that is different from the valid page in which the invalid offset is included, among the plurality of valid pages of the victim block, or is stored in a source block or an open block among a plurality of memory blocks except the victim block.

20. The method according to claim 12, wherein the storing of the valid data corresponding to the predicted logical address and the valid data stored in the plurality of valid offsets of the valid page comprises:
storing the valid data corresponding to the predicted logical address and the valid data stored in the plurality of valid offsets of the valid page, in a memory of the controller;
sequentially sorting the valid data stored in the memory based on logical addresses corresponding to the valid data; and
storing the sorted valid data in the destination block that is selected from among free blocks included in the plurality of memory blocks.

* * * * *